(12) United States Patent
Barberich

(10) Patent No.: US 6,352,233 B1
(45) Date of Patent: Mar. 5, 2002

(54) PORTABLE STAND FOR A LAPTOP COMPUTER

(76) Inventor: George Craig Barberich, 461A Chestnut St., San Francisco, CA (US) 94133

( * ) Notice: Subject to any disclaimer, the term of this patent is extended or adjusted under 35 U.S.C. 154(b) by 0 days.

(21) Appl. No.: 09/434,541

(22) Filed: Nov. 5, 1999

(51) Int. Cl.[7] .................... F16M 1/00; F16M 11/00; F16M 3/00; F16M 5/00; F16M 7/00
(52) U.S. Cl. .................... 248/676; 248/473; 248/456
(58) Field of Search .................... 248/676, 121, 248/164, 165, 174, 918, 473, 488, 490, 455, 456, 469

(56) References Cited

U.S. PATENT DOCUMENTS

| | | | | |
|---|---|---|---|---|
| 1,261,138 A | * | 4/1918 | Lauer | 248/174 X |
| 1,301,797 A | * | 4/1919 | Ziegler | 211/41 X |
| 3,282,437 A | * | 11/1966 | Hansen | 211/41 |
| 3,809,352 A | | 5/1974 | Mathias | 248/451 |
| 5,247,285 A | | 9/1993 | Yokota et al. | 345/169 |
| 5,316,250 A | * | 5/1994 | Mason et al. | 248/165 |
| 5,335,753 A | * | 8/1994 | Campbell | 182/181 |
| 5,822,185 A | | 10/1998 | Cavello | 361/686 |
| 5,973,244 A | * | 10/1999 | McCulloch | 84/327 |
| 6,116,553 A | * | 9/2000 | McKee | 248/174 |

* cited by examiner

Primary Examiner—Ramon O. Ramirez
Assistant Examiner—A. Joseph Wujciak
(74) Attorney, Agent, or Firm—Squire, Sanders & Dempsey LLP

(57) ABSTRACT

A portable stand allows a user to position a laptop computer as well as a full size external keyboard substantially vertically relative to a support surface. The substantially vertical positioning provides improvements to the laptop work environment. The portable stand for a laptop computer includes two generally flat bodies that are attached together along a mating groove. The two flat bodies define a substantially U-shaped area to hold the laptop computer in a substantially vertical position, a groove to hold an external keyboard in a substantially vertical position for storage, and an area for cables and wires to be consolidated and held in position.

1 Claim, 5 Drawing Sheets

PORTABLE STAND FOR A LAPTOP COMPUTER

BACKGROUND OF THE INVENTION

1. Field of the Invention

The present invention relates to laptop computer stands and more particularly to a simple, portable stand that supports a laptop computer substantially vertically on a work surface.

2. Description of Related Art

Laptop computers have become very popular and widely used for both business and personal activities. Laptop computers are typically single, integrated units housed in a single compact case to enhance their portability. Laptop computers generally include a keyboard portion movably attached to a display portion. A disadvantage associated with laptop computers is that the laptop computer requires a relatively large surface space for the user to operate. This is due to the integrated nature of the laptop computer. Both the keyboard portion and the display portion are integrated parts of the computer and cannot be removed from the main body when in use.

An approach to further enhance the portability of laptop computers and to minimize the required surface space when in operation has been disclosed in U.S. Pat. No. 5,247,285 to Yokota. The problem with this design is that it requires the laptop computer to have physically distinct units such as a detachable keyboard, and thus, does not address minimizing surface space for conventional integrated laptop computers without requiring significant changes to the construction of such conventional integrated laptop computers.

Another disadvantage associated with laptop computers is that the height of the standard laptop display requires the user to look down at a slight angle, which is ergonomically undesirable. To overcome some of the ergonomic disadvantages associated with laptops, docking stations have been developed and provide laptop computers with a plurality of connectors to enable laptops to be interfaced with computer networks and desktop computer peripheral equipment, such as larger keyboards, detached mice, monitors, printers, and the like. Thus, once docked within a docking system, such peripheral equipment or network connections can be interfaced with the laptop computer. In this manner, the laptop user can connect a full size keyboard and/or full size monitor to the laptop to take advantage of the larger keys and enhanced functionality of such keyboards. In addition, as the keyboard is detached from the laptop and only connected by a standard computer cable, the user can position the keyboard and full size monitor to an ergonomically attractive position, and can reposition the keyboard as needed for user comfort. A docking station for a portable computer of this type is described in U.S. Pat. No. 5,822,185 to Cavello. This type of design, however, does not address the problem of limited space on a working surface nor the difficulty of managing the numerous computer associated cables.

Accordingly, a need exists to provide a simple, portable laptop computer stand that provides ergonomic viewing advantages, requires less working surface area and provides an area to store a keyboard further minimizing work surface usage and enabling easy maintenance for computer associated cables.

SUMMARY OF THE INVENTION

In accordance with the teachings of this invention, a portable stand for a laptop computer is provided. The portable stand allows a user to position a laptop computer substantially vertically on a work surface such as a desk or a table, thereby improving the laptop work environment. By orienting the computer in a substantially vertical arrangement relative to a support surface, the viewing angle at which the user views the screen is greatly improved. The amount of space on the work surface required for the laptop computer is minimized, and the numerous cables required to connect the computer to external devices are manageable and kept from cluttering the work surface. Also, since the bottom portion of the laptop computer is supported by the stand such that the bottom portion does not rest on and contact the support surface, heat generated by the laptop computer and emitted from the bottom portion is easily dissipated to avoid heat build-up problems.

According to a preferred embodiment of the present invention, the portable stand for a laptop computer includes generally substantially rigid first and second members attachable to each other along a connecting member such as a mating groove. The first and second members, when attached, define a flat, substantially U-shaped area to hold the laptop computer in a substantially vertical position relative to a support surface, a groove to hold an external keyboard in a vertical position for storage and at least one groove for positioning cables and wires connected to the laptop computer.

A more complete understanding of the portable stand for a laptop computer will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
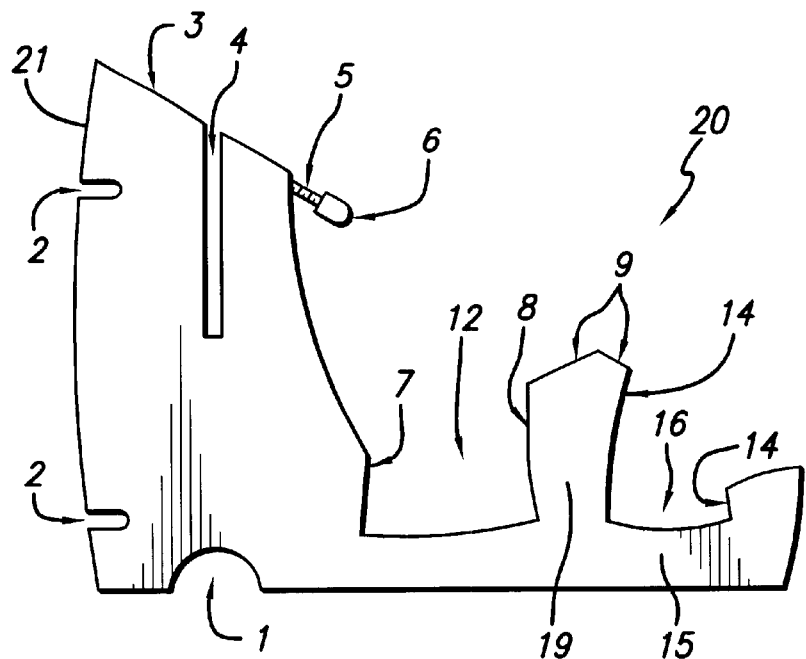
FIG. 1 is a side view of a first member of a portable stand for a laptop computer according to a preferred embodiment of the present invention.

The present invention provides a portable stand for a laptop computer that allows a user to position the laptop computer in a substantially vertical position relative to a support surface to improve the laptop work environment. In the detailed description that follows, it should be appreciated that like reference numerals are used to describe like elements illustrated in one or more of the figures.

Referring first to FIG. 1, a side view of a first member 20 of a portable stand for a laptop computer according to a preferred embodiment of the present invention is provided. The first member 20 preferably includes a rigid, substantially flat body including a substantially U-shaped cutout portion 12 in which a laptop computer may be supported in a substantially vertical position relative to a support surface and a groove 16 in which an external keyboard may be placed for storage as will be described below. A protrusion 19 is provided between the substantially U-shaped area 12 and the groove 16 and includes a laptop front rest 8, a keyboard back rest 14, and a top edge defined by laptop and keyboard sliding surfaces 9. The substantially U-shaped area 12 preferably includes a tilt guard 7 and the laptop front rest 8 of the protrusion 19. The groove 16 is defined by the keyboard back rests 14 and a support member 15 extending from the base of the substantially U-shaped area 12.

It should be noted that in alternative embodiments, the bottom member 20 may be provided without the extending support member 15 and the groove 16, thereby eliminating the capability for holding an external keyboard in a vertical position.

Cutout members 2 are preferably provided along a back end 21 of the first member 20 to receive an elastic strap as will be described below. A joining groove 4 is preferably located along an angled laptop surface 3 at a top portion of the first member 20. A cable accommodating cutout 1 is preferably provided at a bottom portion of the first member 20 in proximity to the rear portion 21. An adjustable screw 5 having a rubber end cap 6 is preferably provided at an edge below the angled laptop surface 3 near the top portion of the first member 20. The first member 20 is generally a flat, solid piece of material and may be comprised of synthetic, plastic, wood, metal, or other suitable materials strong enough to support a laptop computer or a keyboard.

Figure 2:
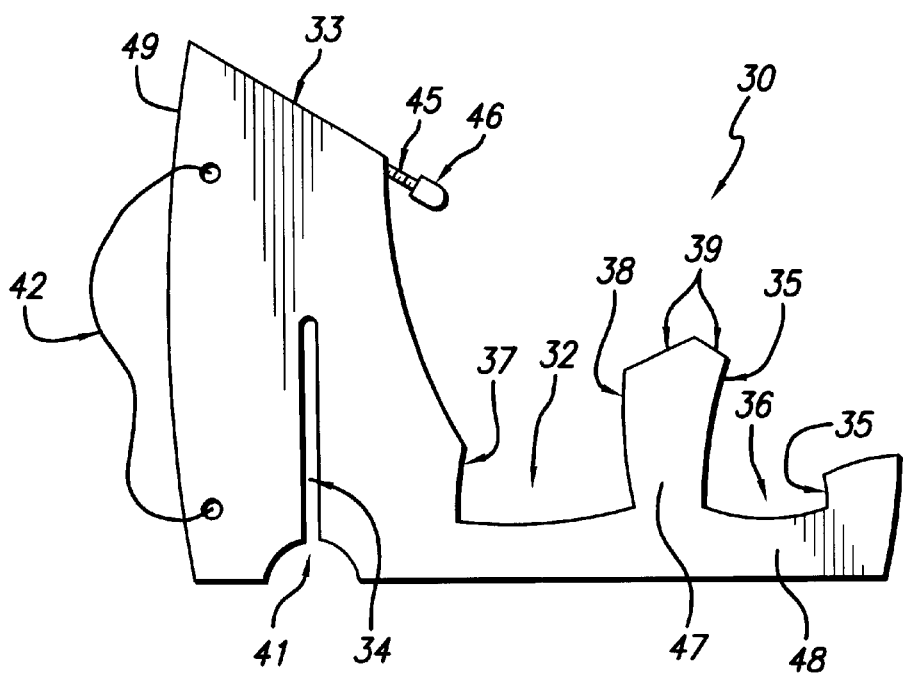
FIG. 2 is a side view of a second member of a portable stand for a laptop computer according to a preferred embodiment of the present invention.

Referring now to FIG. 2, a side view of a second member 30 of a portable stand for a laptop computer according to a preferred embodiment of the present invention is provided. The second member 30 is constructed to be attached to the first member 20 illustrated in FIG. 1. The second member 30 preferably includes a rigid, substantially flat body and a connecting groove 34 that is correspondingly located to be mated with the joining groove 4 of the first member 20. Similar to the first member 20, the second member 30 preferably includes a substantially U-shaped cutout 32 in which a laptop computer may be placed in a substantially vertical position and a groove 36 in which an external keyboard may be supported in a substantially vertical position for storage. A protrusion 47 is preferably located between the substantially U-shaped cutout 32 and the groove 36 and includes a laptop front rest 38, a keyboard back rest 35, and a top edge formed by laptop and keyboard sliding surfaces 39. The substantially U-shaped cutout 32 is defined by a tilt guard 37 and the laptop front rest 38 of the protrusion 47. The groove 36 is defined by the keyboard back rests 35 and a support member 48 extending from the base of the substantially U-shaped cutout 32.

It should be noted that in alternative embodiments, the second member 30 may be provided without the extending support member 48 and the groove 36, thereby eliminating the capability for holding an external keyboard in a substantially vertical position.

An adjustable screw 45 having a rubber end cap 46 may be preferably provided at an edge below an angled laptop slide surface 33, which is at a top portion of the second member 30. The adjustable screws 5, 45 with rubber caps 6, 46 together define a back rest for the laptop computer. The ability to screw the adjustable screw 45 in conjunction with the adjustable screw 5 of the bottom leg 20 allows the user to adjust the viewing angle and adjust the portable stand for different sizes of laptop computers. A cable accommodating cutout 41 is preferably provided at the bottom portion of the second member 30 in proximity to a back end 49 to facilitate cable maintenance as will be described below. The joining groove 34 is located on top of the cable accommodating cutout 41, but may be placed at any point along the bottom portion of the second m ember 30 that is correspondingly located to be mated with the joining groove 4 of the first member 20. An elastic strap 42 is attached in proximity to the back end 49 of the second member 30 so that it may be wrapped around the cutout members 2 of the first member 20. The second member 30 may be comprised of a generally flat, single piece of material such as synthetic, plastic, wood, metal, or other suitable material strong enough to support a laptop computer or a keyboard.

Figure 3:
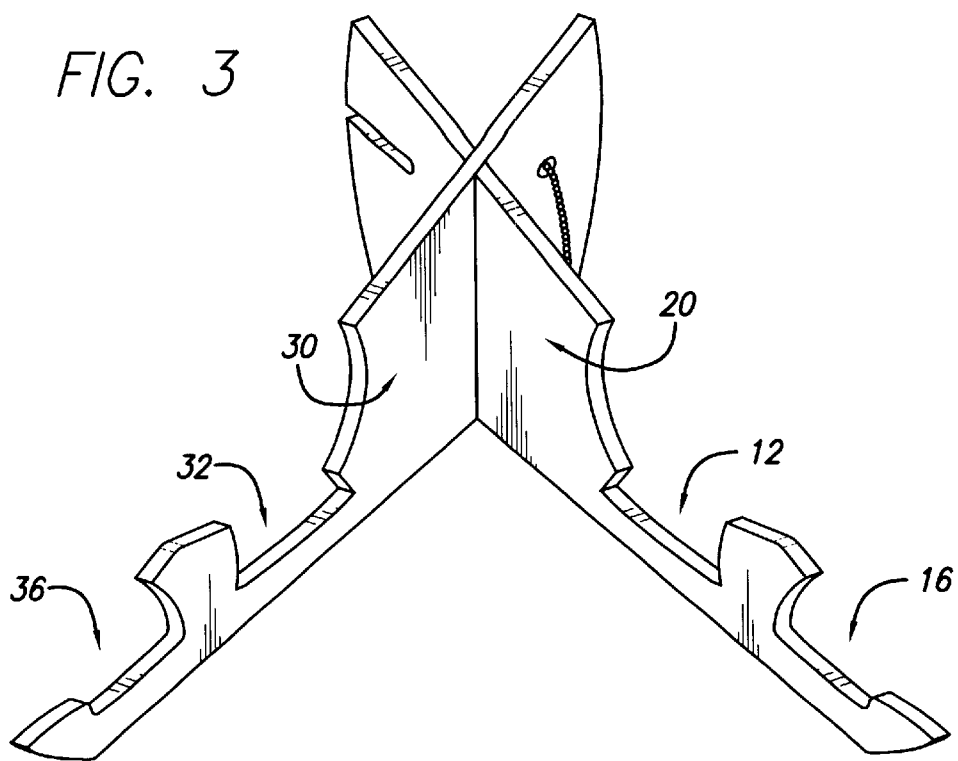
FIG. 3 is a front view of the first and second members of a portable stand attached together according to a preferred embodiment of the present invention.
Figure 4:
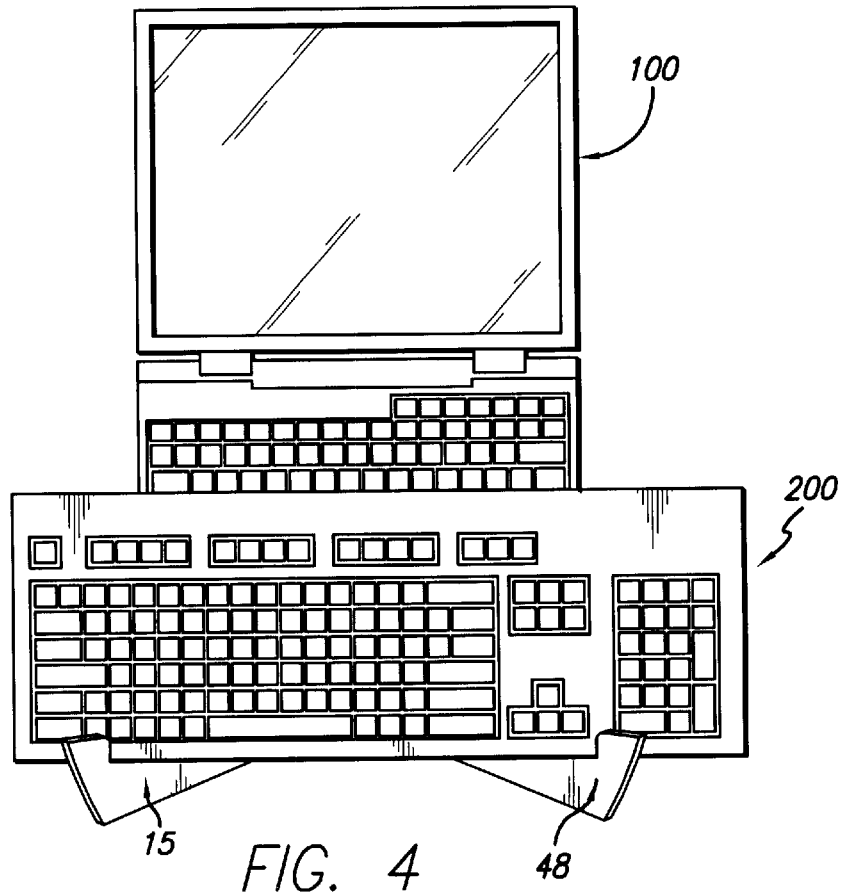
FIG. 4 is a front view of a portable stand holding a laptop computer and an external keyboard according to a preferred embodiment of the present invention.
Figure 5:
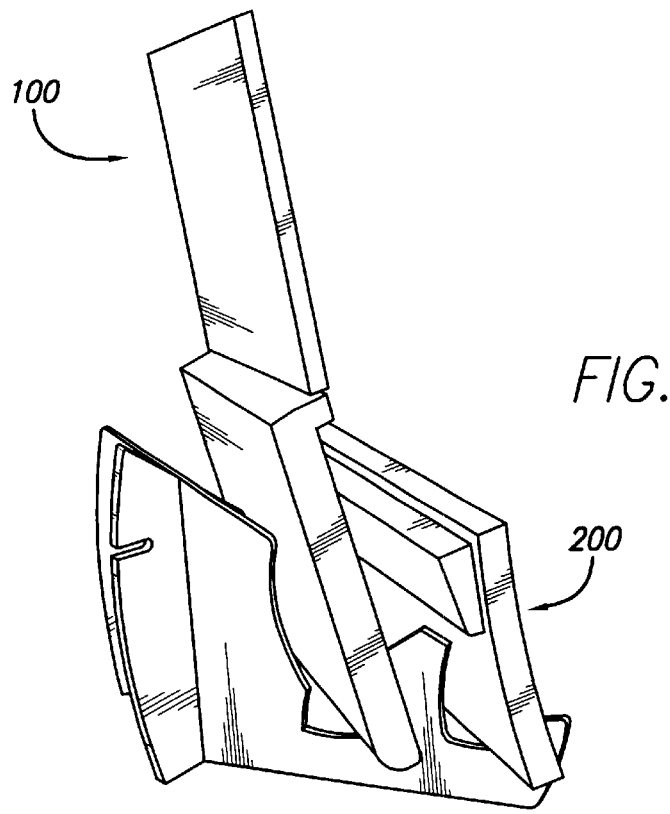
FIG. 5 is a side view of a portable stand holding a laptop computer and an external keyboard according to a preferred embodiment of the present invention.
Figure 6:
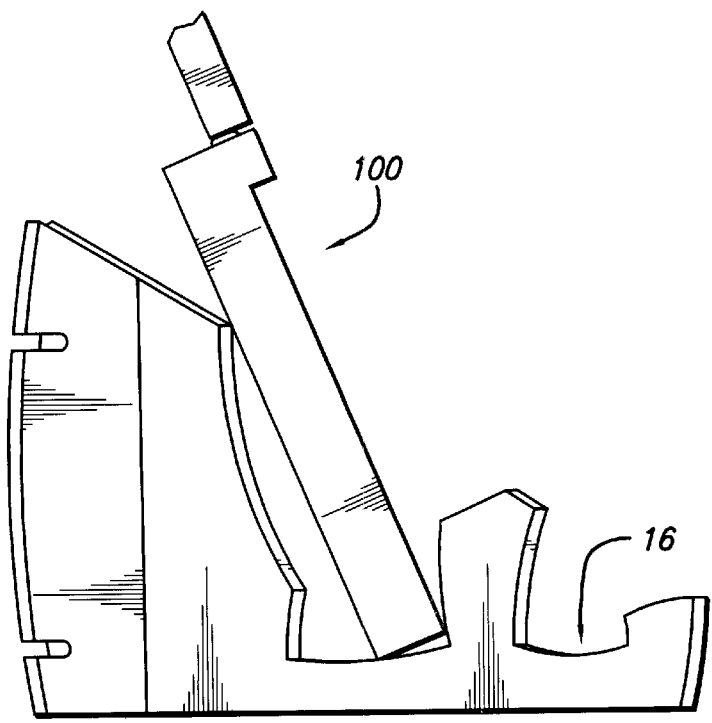
FIG. 6 is a side view of a portable stand holding only a laptop computer according to a preferred embodiment of the present invention.

Referring now to FIG. 3, a front view of the first and second members of a portable stand connected together according to a preferred embodiment of the present invention is provided. The first member 20 and the second member 30 are mated together along the respective joining grooves 4, 34. The substantially U-shaped areas 12, 32 are adapted to receive and support a laptop computer as is better illustrated in FIG. 6, which shows a side view of a portable stand holding a laptop computer 100 according to a preferred embodiment of the present invention. Grooves 16, 36 shown in FIG. 3 are adapted to receive and support an external keyboard. An external keyboard 200 is supported by extended support members 15, 48, as illustrated in FIGS. 4 and 5, which respectively show a front view and a side view of laptop 100 and keyboard 200 positioned in the portable stand. It can be appreciated that by orienting the laptop and the keyboard in substantially vertical positions relative to a support surface such as a desktop or table, the working surface area is maximized. The use of the portable stand allows the user to minimize the amount of space on the support surface required for the laptop computer. The user is able to raise the height of the laptop computer display screen relative to the support surface and improve the viewing angle at which the user views the laptop computer display screen. It should also be appreciated that the construction of the portable stand allows for the first member 20 and the second member 30 to easily slide apart and collapse into two flat pieces that are easily portable. In an alternative embodiment, a hinge may be used to hold the first and second members together.

Figure 7:
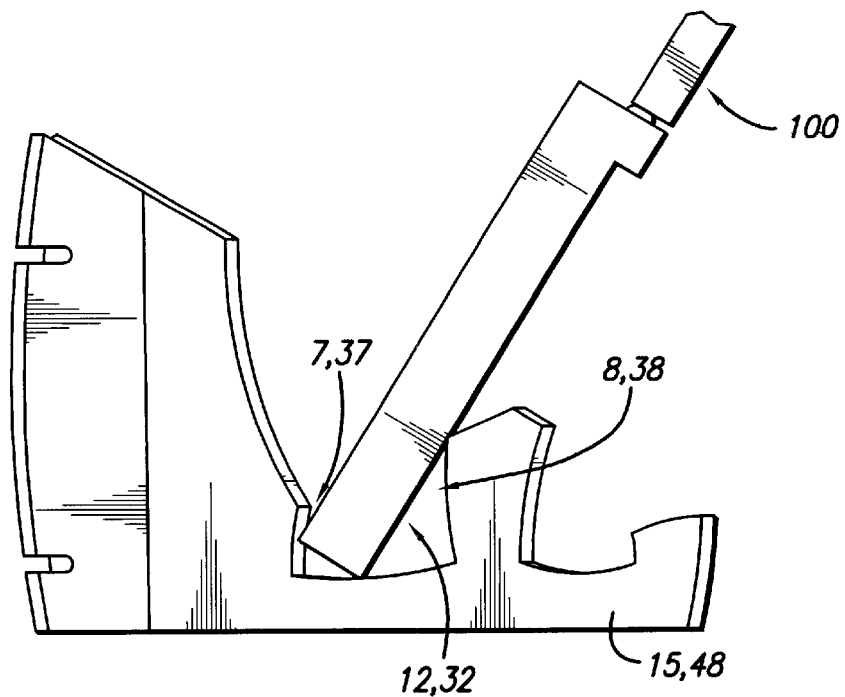
FIG. 7 is a side view of a portable stand holding a laptop computer illustrating a substantially U-shaped tilt guard and extended support member according to a preferred embodiment of the present invention.

Referring now to FIG. 7, a side view of a portable stand holding a laptop computer illustrating a substantially U-shaped tilt guard and extended support member according to a preferred embodiment of the present invention is provided. As seen in FIG. 7, one advantage of the present invention is that the laptop computer 100 is secured within the substantially U-shaped cutouts 12, 32 defined by the first and second members and the respective tilt guards 7, 37 while the laptop front rests 8 and 38 provide the needed support. The substantially U-shaped cutouts prevent the computer from falling forward. The shape of the holder (substantially U-shaped) and the extended support member 15, 48 disposed below the keyboard holder, prevents the computer from falling forward.

Figure 8:
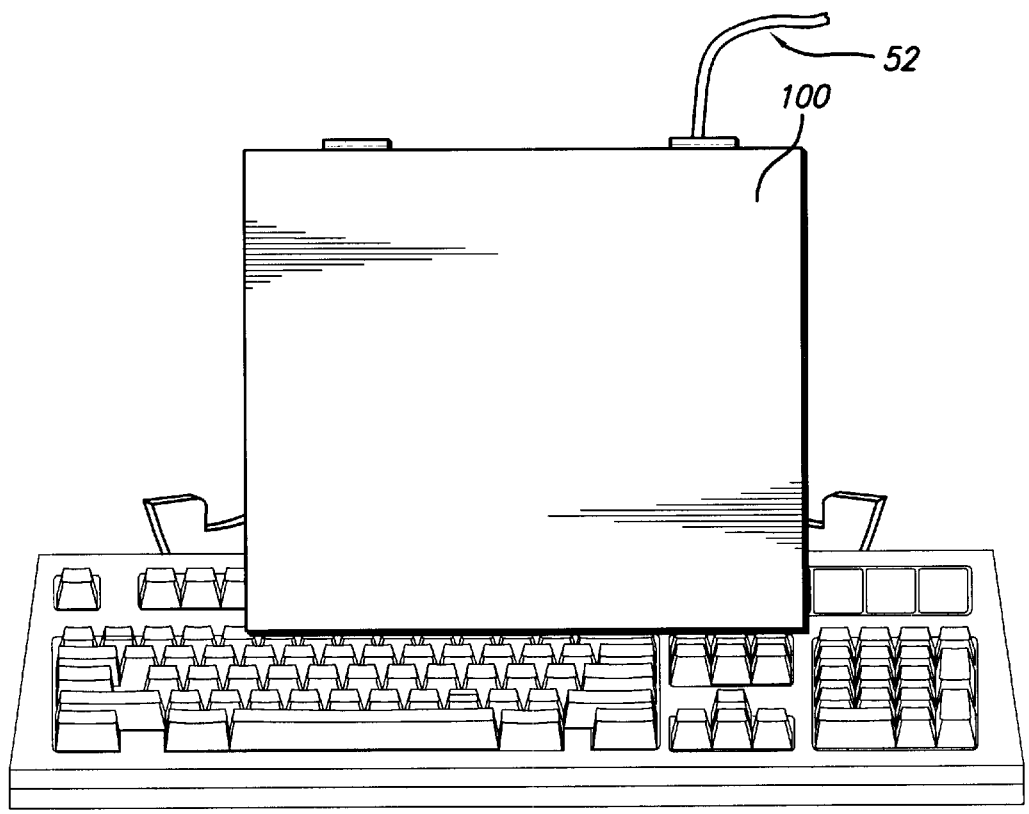
FIG. 8 is a front view of a portable stand holding a tilted laptop computer illustrating access to cables according to a preferred embodiment of the present invention.

Referring now to FIG. 8, a front view of a portable stand holding a tilted laptop computer illustrating access to cables according to a preferred embodiment of the present invention is provided. A plurality of connectors and cables 52 may be used to enable the laptop computer 100 to be interfaced with PC networks and desktop computer peripheral equipment such as larger keyboards, detached mice, monitors, printers and the like. Laptop computer 100 is tilted forward over the laptop sliding surfaces 9, 39. This laptop computer support position provides easy access for maintenance or general handling of connectors and cables 52.

Figure 9:
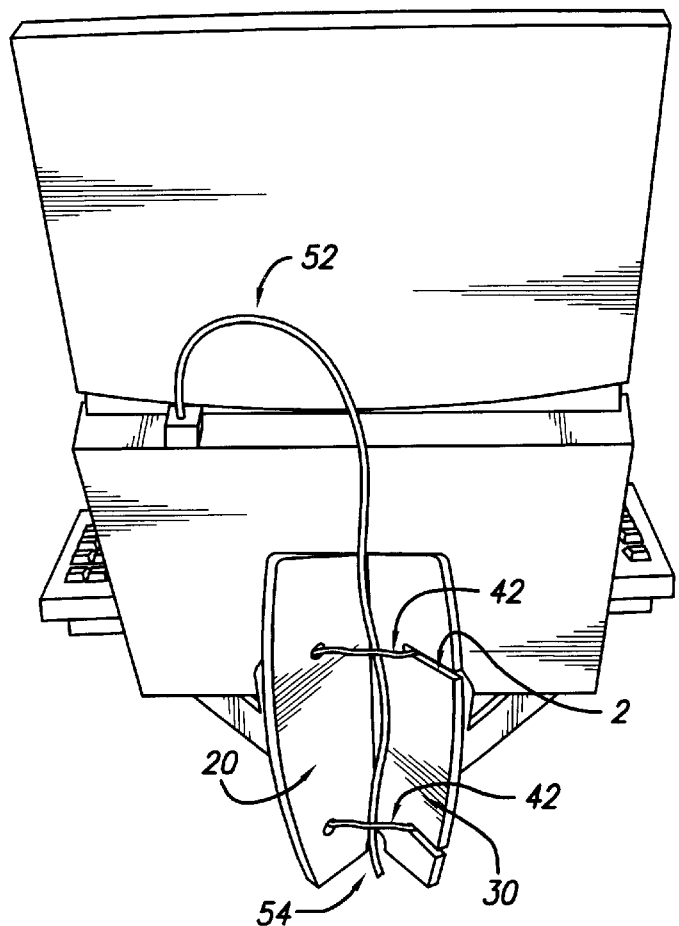
FIG. 9 is a rear view of a portable stand illustrating cable maintenance according to a preferred embodiment of the present invention.

Referring now to FIG. 9, a rear view of a portable stand illustrating cable maintenance according to a preferred embodiment of the present invention is provided. A substantially V-shaped portion 54 is defined by the first member 20 and the second member 30 when attached together. Cables 52 are routed over the top edges of the first and second members 20, 30 such that the cables are kept neatly inside of the substantially V-shaped portion 54. This keeps cables 52 from cluttering the work surface. To aid in organizing cables 52, an elastic strap 42 is preferably stretched across the opening of the substantially V-shaped portion 54, around the cables 52, and hooked on the cutouts 2 so that the cables are held securely within the substantially V-shaped portion 54. In addition, improved organization and positioning of cables 52 is achieved by passing the cables from the front of the stand directly under and through the cable accommodating cutouts 1, 41 of the stand, shown in FIGS. 1 and 2, and into the substantially V-shaped portion 54 rather than around the side of the stand. Cables 52 may comprise connecting cables for a power supply, network or other external devices such as a mouse, a keyboard, etc. It should be noted that in an alternative embodiment, a hinge may be used to hold the first and second members together so that much of the back V-area for holding cables is eliminated.

Figure 10:
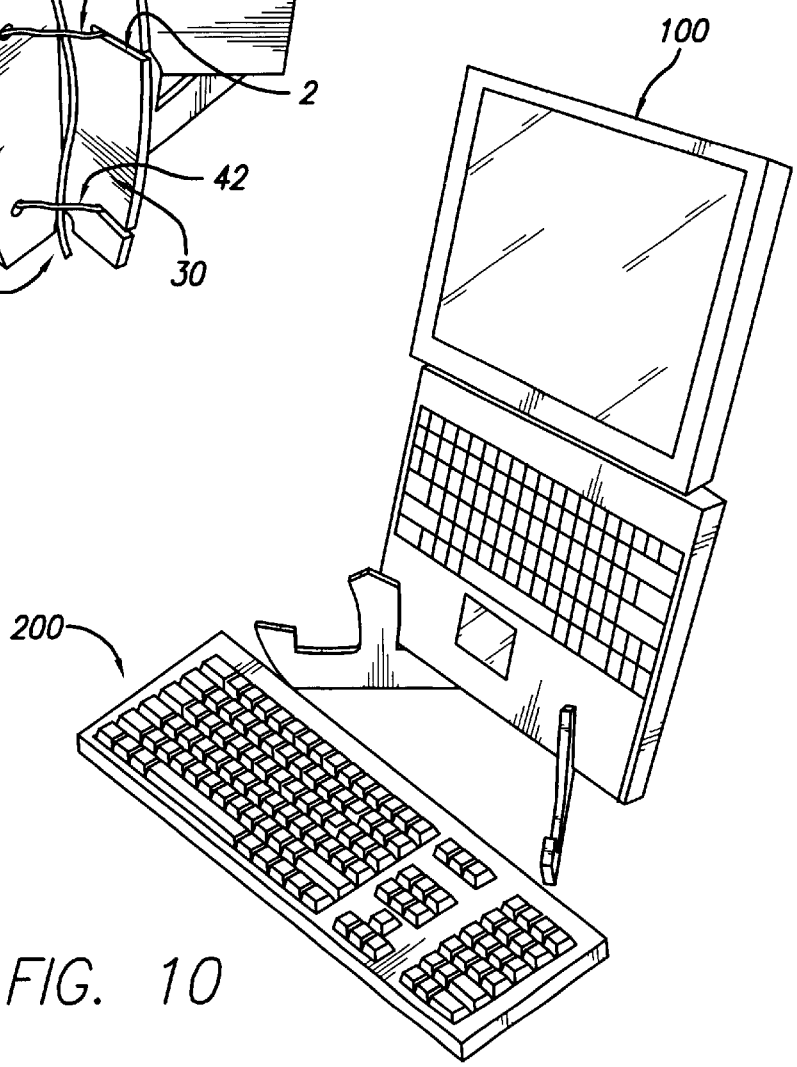
FIG. 10 is a perspective view of a portable stand in use according to a preferred embodiment of the present invention.

Referring now to FIG. 10, a perspective view of a portable stand in use according to a preferred embodiment of the present invention is provided. Once provided in the portable stand, peripheral equipment or network connections can be interfaced with the laptop computer 100 so that the laptop computer user can connect an external full size keyboard 200 to the laptop computer 100 to take advantage of the larger keys and enhanced functionality of such a keyboard. Because the external keyboard is detached from the laptop computer and only connected by a standard computer cable, the user can position the keyboard to an ergonomically attractive position, and can reposition the keyboard as needed for user comfort. In addition, the display of the thus-supported laptop computer 100 is raised providing a normal view range of the user without undue movement of the user's head and eyes from a level, resting position. The added height allows users to avoid discomfort and prevent repetitive stress related injuries.

Having thus described a preferred embodiment of a portable stand for a laptop computer, it should be apparent to those skilled in the art that certain advantages of the within system have been achieved. It should also be appreciated that various modifications, adaptations, and alternative embodiments thereof may be made within the scope and spirit of the present invention. For example, a portable stand for a laptop computer comprised generally of solid pieces of material has been illustrated, but it should be apparent that the inventive concepts described above would be equally applicable to a laptop computer stand having an outline formed in a wire frame. The invention is further defined by the following claims.

What is claimed is:

1. A laptop computer stand comprising:

a first member; and a second member adapted to be joined with said first member, wherein said first member and said second member when joined together define a support portion adapted to receive a laptop computer in a substantially vertical position relative to a support surface, wherein said first member and said second member further comprise a top end and an adjustable screw in proximity to said top end adapted to adjust the computer stand for different sizes of laptop computers, and wherein said adjustable screw further comprises a rubber end cap.

* * * * *